United States Patent [19]

Blevins

[11] Patent Number: 5,588,747

[45] Date of Patent: Dec. 31, 1996

[54] MEASURING CUP WITH EXTERNALLY-MOUNTED LIQUID CRYSTAL THERMOMETER

[76] Inventor: Terry D. Blevins, 5808 Tree Mountain Pkwy., Stone Mountain, Ga. 30083

[21] Appl. No.: 369,678

[22] Filed: Jan. 5, 1995

Related U.S. Application Data

[63] Continuation-in-part of Ser. No. 252,588, Jun. 1, 1994, abandoned.

[51] Int. Cl.⁶ .............................. G01K 1/14; G01K 13/12
[52] U.S. Cl. .............................. 374/157; 374/150; 73/427
[58] Field of Search .................... 374/150, 162, 374/157, 141; 73/427

[56] References Cited

U.S. PATENT DOCUMENTS

| | | | |
|---|---|---|---|
| D. 343,129 | 1/1994 | Farley | 374/150 |
| 3,658,122 | 4/1972 | Kalyk | 374/150 |
| 3,864,976 | 2/1975 | Parker | 374/150 |
| 4,156,365 | 5/1979 | Heinmets et al. | 374/141 |
| 4,538,926 | 9/1985 | Chretien | 374/162 |
| 4,541,733 | 9/1985 | Andre | 374/149 |
| 4,555,040 | 11/1985 | Butenschon | 374/150 |
| 4,878,588 | 11/1989 | Ephraim | 374/150 |
| 5,482,373 | 1/1996 | Hutchinson | 374/162 |

FOREIGN PATENT DOCUMENTS

| | | | |
|---|---|---|---|
| 2426249 | 1/1980 | France | 374/150 |
| 0883051 | 7/1953 | Germany | 374/150 |
| 0011968 | of 1885 | United Kingdom | 374/150 |

*Primary Examiner*—Diego F. F. Gutierrez
*Attorney, Agent, or Firm*—Harry I. Leon; Vivian L. Steadman

[57] ABSTRACT

A measuring cup with a thermometer mounted on an exterior surface thereof for measuring the temperature of a liquid prior to placing it in the cup. The cup can be used in many operations involving a liquid which have a critical temperature requirement. One such operation is breadmaking in which water, once it has been warmed to a desired temperature, is added to yeast or, alternately, to a flour mixture containing yeast. To use the cup in breadmaking, the cup is placed under a stream of warm water and, when the thermometer indicates the water has reached the desired temperature, the water in a measured amount is added to the cup.

2 Claims, 1 Drawing Sheet

U.S. Patent     Dec. 31, 1996     5,588,747
FIG. 1.
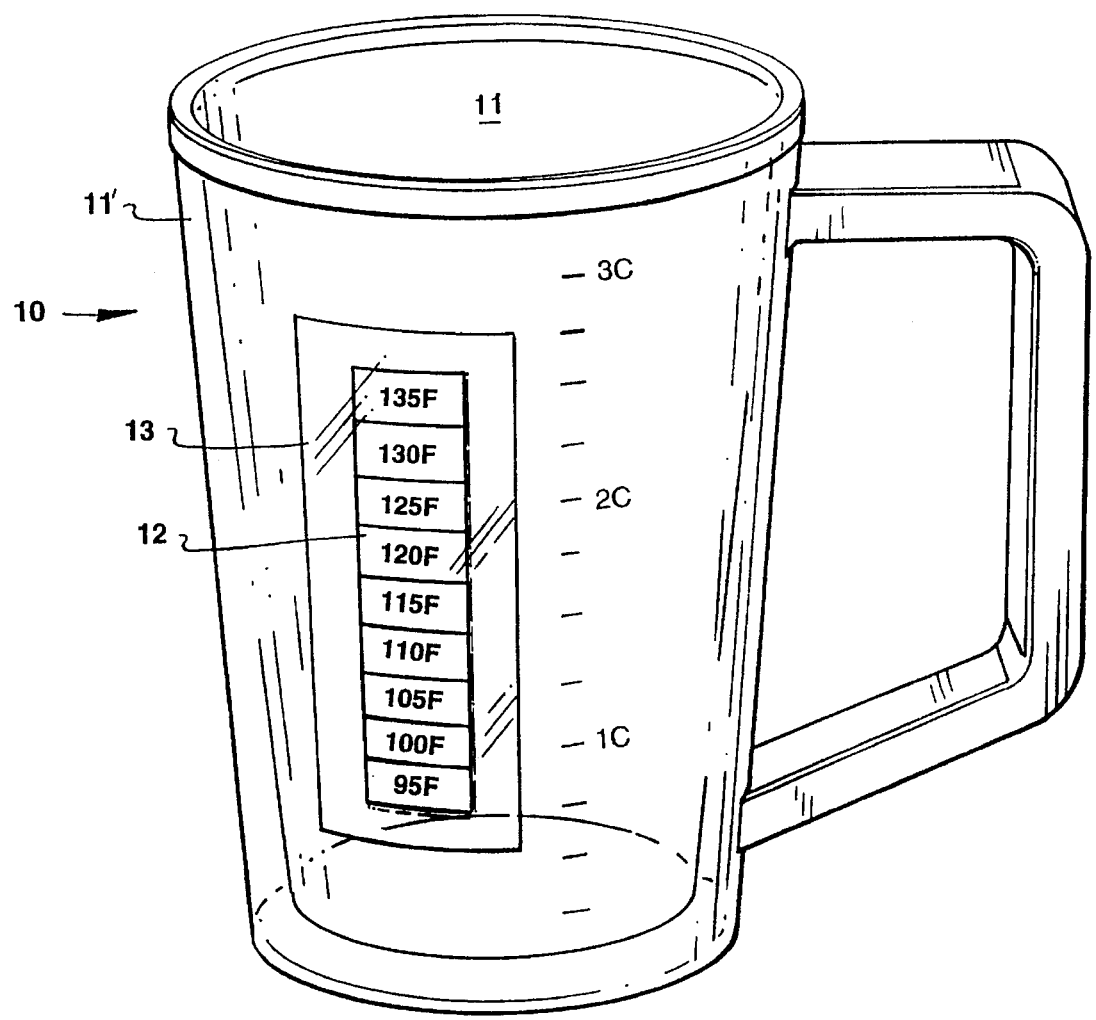
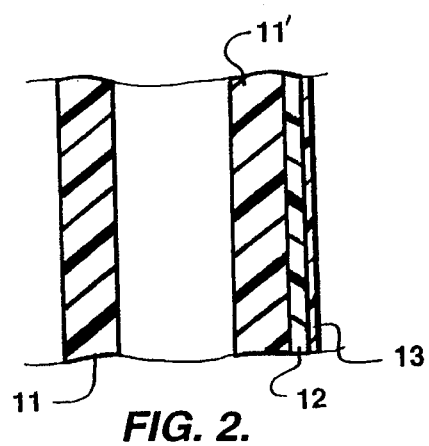
FIG. 2.

MEASURING CUP WITH EXTERNALLY-MOUNTED LIQUID CRYSTAL THERMOMETER

CROSS-REFERENCE TO RELATED APPLICATION

This application is a continuation-in-part of application, Scr. No. 08/252,588, filed June 1, 1994, now abandon.

BACKGROUND OF THE INVENTION

The present invention relates generally to the field of temperature measuring devices, and in its preferred embodiments, devices which can be used both to measure the temperature of a liquid stream and to collect a sample of the liquid when the liquid reaches a desired temperature.

Securing a thermometer to the surface of a container is not new in the art. Nevertheless, patents have issued as recently as 1994 for containers which have or suggest surface-mounted thermometers, including U.S. Pat. No. D. 343,129 to Farley, U.S. Pat. No. 5,282,683 to Brett, and U.S. Pat. No. 5,304,003 to Winnonger. Farley discloses a measuring cup adorned with a pictorial of a mercury bulb-type thermometer. Brett and Winnongur, on the other hand, teach working apparatus. In particular, Brett's assembly utilizes a removable thermometer to measure the temperature of a liquid held in a cup; his thermometer is a resilient insert containing a liquid crystal thermometer which, placed inside the cup, conforms to the shape of its interior wall. Winnongur also employs a liquid crystal thermometer; the latter is mounted facing an aquarium wall so that it can be read through the aquarium water.

Each of these prior art combinations has a thermometer for sensing the temperature of liquid retained within a cup, an aquarium or the like. None of the prior art containers has a thermometer mounted thereon which can be used to measure the temperature of a liquid before it is collected and held in the container.

SUMMARY OF THE INVENTION

The object of this invention is to provide a hand-held utensil with thermometer affixed thereto for use in temperature-sensitive processes such as breadmaking, the utensil allowing a user to collect warm water as it is being discharged from a faucet but only after the water has increased in temperature to a point such that the water is at a proper temperature for use in the process.

A further object of this invention is to provide such an utensil in which the thermometer has a rapid response time, is easily readable, and, in the event the thermometer were to be broken, would present no hazard to a user.

In accordance with the invention, there is provided an insulated, double-walled measuring container having a liquid crystal thermometer mounted on an exterior surface thereof. To protect the liquid crystal thermometer, it is encased between the container and a transparent film affixed thereto, the film and its juncture with the container forming a water-tight seal.

When used in breadmaking, the improved container is initially positioned beneath a faucet so that water discharging therefrom flows over the thermometer but not into the receptacle of the container, keeping it from being exposed to any cooler water coming out of the tap. When water at the proper temperature is finally obtained, the water is captured in the container and, preferably, allowed to rest there for a few minutes, warming the interior walls of the insulated, double-walled container to this same temperature. Afterwards, the water level in the container is reduced to the level specified in a recipe; and other breadmaking ingredients, including yeast and sugar, are added.

Alternately, for breadmaking, dry ingredients, including yeast, sugar and optionally flour, are placed in the container before water from the faucet is allowed to run across the thermometer. When the thermometer indicates the flowing water has reached the proper temperature, the water is allowed to flow into the cup; and the water and other ingredients are mixed together.

Employed in either of these breadmaking methods, the insulated walls of the container serve to hold the temperature of the mixture nearly constant while the yeast is activated.

Furthermore, in embodiments used in breadmaking, the liquid crystal thermometer affixed to the improved container preferably indicates temperatures which range from about 95 degrees F. to 135 degrees F. This range allows the improved container to be used with yeast, sugar, and water mixtures either alone or with flour. Experience has shown that when the improved container is used to activate yeast without flour, the ideal temperature is between 105 degrees F. and 115 degrees F; and when mixed with flour, the ideal temperature is between 120 degrees F. and 130 degrees F.

The improved container, when used for breadmaking, both greatly reduces the time involved and increases the quality of the bread product.

BRIEF DESCRIPTION OF THE DRAWINGS

FIG. 1 is a perspective view of the measuring container with externally-mounted liquid crystal thermometer according to the present invention; and FIG. 2 is a fragmentary cross-sectional view, on an enlarged scale, of the measuring container according to FIG. 1.

DESCRIPTION OF THE PREFERRED EMBODIMENT

In the drawings is shown a device 10 having a receptacle 11 and a liquid crystal thermometer 12 mounted on the exterior wall 11' of the device. The thermometer 12 is provided for measuring the temperature of a liquid that is to be allowed, once it reaches a desired temperature, to enter the receptacle 11.

In the preferred embodiment, the device 10 is an insulated container having double walls in which the receptacle 11 is separated by an air gap from the exterior wall 11'. The container can be made from glass, plastic or metal. The liquid crystal thermometer 12 is affixed to the wall 11' with an adhesive. To make the thermometer 12 waterproof, a protective, transparent film 13 is also affixed to the wall 11' so as to encase the thermometer 12. Alternately, urethane varnish or equivalent can used as a coating to protect the thermometer 12 from moisture.

For use in breadmaking, the device 10 preferably a container marked with measurement indicia such as "1C". "2C", and "3C" and has a 3 cup capacity, the optimum size for making one loaf of bread. However, smaller or larger containers can also be utilized.

It is claimed:

1. A device adapted for use in mixing proper quantities of ingredients at a desired temperature, comprising:

(a) an insulated measuring cup having a structure which defines an upper-rim and interior and exterior walls joined thereto, the interior wall defining a receptacle, contiguous portions of the interior and exterior walls located downwardly of the upper rim being spaced apart from each other and separated by an air gap; and (b) a liquid crystal thermometer fixedly attached to the exterior wall of the cup so that the thermometer is thermally isolated from the receptacle.

2. The device according to claim 1 which further comprises means for protecting the liquid crystal thermometer from moisture, the protecting means including a moisture-resistant, transparent film affixed to the exterior wall, the thermometer being encased between the film and the exterior wall, each juncture of the film with the wall forming a water-tight seal.

* * * * *